United States Patent
Tamir et al.

(10) Patent No.: US 10,438,633 B2
(45) Date of Patent: Oct. 8, 2019

(54) METHOD AND SYSTEM FOR LOW COST TELEVISION PRODUCTION

(71) Applicant: PIXELLOT LTD., Tel Aviv (IL)

(72) Inventors: Miky Tamir, Tel Aviv (IL); Gal Oz, Kfar Saba (IL)

(73) Assignee: PIXELLOT LTD., Petach Tikva (IL)

( * ) Notice: Subject to any disclaimer, the term of this patent is extended or adjusted under 35 U.S.C. 154(b) by 0 days.

(21) Appl. No.: 14/893,077

(22) PCT Filed: May 26, 2014

(86) PCT No.: PCT/IL2014/050472
§ 371 (c)(1),
(2) Date: Nov. 23, 2015

(87) PCT Pub. No.: WO2014/191990
PCT Pub. Date: Dec. 4, 2014

(65) Prior Publication Data
US 2016/0104510 A1    Apr. 14, 2016

Related U.S. Application Data

(60) Provisional application No. 61/827,602, filed on May 26, 2013.

(51) Int. Cl.
*H04N 5/225*    (2006.01)
*H04N 5/232*    (2006.01)
(Continued)

(52) U.S. Cl.
CPC ........... *G11B 27/036* (2013.01); *H04N 5/222* (2013.01); *H04N 5/23206* (2013.01);
(Continued)

(58) Field of Classification Search
CPC .. H04N 5/2259; H04N 5/232; H04N 5/23238; H04N 5/2328; H04N 5/335;
(Continued)

(56) References Cited

U.S. PATENT DOCUMENTS 5,604,534 A * 2/1997 Hedges ................ G01C 11/025
348/106
6,788,333 B1 * 9/2004 Uyttendaele ....... H04N 5/23238
348/36

(Continued)

FOREIGN PATENT DOCUMENTS

| CN | 102164298 | 8/2011 |
|---|---|---|
| EP | 2490179 | 8/2012 |

(Continued)

OTHER PUBLICATIONS

Richard Szeliski; Image Alignment and Stitching: A Tutorial; Dec. 10, 2006; retrieved from the internet: http://research.microsoft.com/pubs/70092/tr-2004-92.pdf.

(Continued)

*Primary Examiner* — Thai Q Tran
*Assistant Examiner* — Syed Y Hasan
(74) *Attorney, Agent, or Firm* — Pearl Cohen Zedek Latzer Baratz LLP

(57) ABSTRACT

It is provided a method for producing a stream of desired image frames derived from a panoramic capturing of a scene by an array of video cameras. The production is conducted by a coordinated operation at a venue proximate to the scene and at a production suite located remotely from the venue. The method includes a venue server recording a stream of raw video images captured simultaneously by the video-cameras, and converting the stream of raw video images at a first data rate to a stream of panoramic views at a second data rate. The second data rate is less than one third of the first data rate. The method further includes transmitting the stream of panoramic views to a remote production suite, and there selecting a stream of desired frames including respective regions of interest. The method further includes transmitting data on the stream of desired frames to the venue server, and the venue server producing out of the recorded (Continued)

stream of raw video images, a stream of high resolution frames. The high resolution frames are characterized by non perceptible boundaries between neighboring images derived from respective neighboring raw video images.

12 Claims, 5 Drawing Sheets

(51) Int. Cl.
| | |
|---|---|
| *H04N 5/247* | (2006.01) |
| *H04N 5/265* | (2006.01) |
| *H04N 7/18* | (2006.01) |
| *H04N 13/239* | (2018.01) |
| *H04N 13/243* | (2018.01) |
| *H04N 21/218* | (2011.01) |
| *H04N 21/2365* | (2011.01) |
| *G08B 13/196* | (2006.01) |
| *G11B 27/036* | (2006.01) |
| *H04N 5/222* | (2006.01) |
| *H04N 5/262* | (2006.01) |
| *H04N 5/44* | (2011.01) |

(52) U.S. Cl.
CPC ..... *H04N 5/23238* (2013.01); *H04N 5/23245* (2013.01); *H04N 5/247* (2013.01); *H04N 5/265* (2013.01); *H04N 5/2624* (2013.01); *H04N 5/44* (2013.01); *G08B 13/19645* (2013.01); *H04N 5/2259* (2013.01); *H04N 7/181* (2013.01); *H04N 13/239* (2018.05); *H04N 13/243* (2018.05); *H04N 21/21805* (2013.01); *H04N 21/2365* (2013.01)

(58) Field of Classification Search
CPC ............... H04N 7/181; H04N 13/0048; H04N 13/0296; A63B 2270/806; G08B 13/19645
USPC ........ 386/223; 348/36, 42, 47, 48, 157, 159, 348/239, 294; 382/154
See application file for complete search history.

(56) References Cited

U.S. PATENT DOCUMENTS

| | | | |
|---|---|---|---|
| 7,773,126 B1* | 8/2010 | Lee .................... | H04N 1/2112 348/159 |
| 8,866,912 B2* | 10/2014 | Mullis ................. | H04N 17/002 348/187 |
| 2004/0032495 A1 | 2/2004 | Ortiz | |
| 2004/0085256 A1* | 5/2004 | Hereld .................... | H04N 9/12 345/1.1 |
| 2005/0094562 A1 | 5/2005 | Roy et al. | |
| 2010/0026809 A1* | 2/2010 | Curry .................... | H04N 5/222 348/157 |
| 2012/0013711 A1 | 1/2012 | Tamir et al. | |
| 2013/0070047 A1* | 3/2013 | DiGiovanni .......... | H04N 5/222 348/36 |
| 2014/0286566 A1* | 9/2014 | Rhoads ............. | H04N 13/0275 382/154 |

FOREIGN PATENT DOCUMENTS

| | | |
|---|---|---|
| JP | 2009-060664 | 3/2009 |
| WO | WO 2006/009521 | 1/2006 |

OTHER PUBLICATIONS

Office Action dated May 23, 2018 from corresponding Japanese Application No. 2016-514535.

\* cited by examiner

METHOD AND SYSTEM FOR LOW COST TELEVISION PRODUCTION

CROSS REFERENCE TO RELATED APPLICATION

This application claims the benefit of priority of U.S. Provisional Application Ser. No. 61/827,602, filed on May 26, 2013, entitled " METHOD AND SYSTEM FOR LOW COST TELEVISION PRODUCTION" by Miky Tamir and Gal Oz, the content of which is relied upon and incorporated herein by reference in its entirety.

BACKGROUND OF THE INVENTION

Field of the Invention

The invention is in the field of an efficient low cost replacement to outdoors (mainly sports) television productions and more particularly cloud based (remote) real time and offline productions.

Description of Related Art

A television coverage of sports scenes is spreading to a variety of sports events, which in the past were not covered. However, the cost of full venue production including a large team and several cameras prohibits high quality coverage. On the other hand, the home users expect to get a TV production which covers the whole scene, focuses on events occurring in various locations during a game, and having replays of dramatic moments. Thus, the objective of the current invention is to suggest a low cost efficient television production, to replace current outdoor productions of sports scenes that are too expensive in equipment and manpower.

BRIEF SUMMARY OF THE INVENTION

It is provided according to preferred embodiment of the present application, a method for producing a stream of desired image frames derived from a panoramic capturing of a scene by an array of video cameras. The production is conducted by a coordinated operation at a venue proximate to the scene and at a production suite located remotely from the venue. The method includes a venue server recording a stream of raw video images captured simultaneously by the video cameras, and converting the stream of raw video images at a first data rate to a stream of panoramic views at a second data rate. The second data rate is less than one third of the first data rate. The method further includes transmitting the stream of panoramic views to a remote production suite, and there selecting a stream of desired frames including respective regions of interest. The selected frames are portions of respective panoramic views. The method further includes transmitting data on the stream of desired frames to the venue server, and the venue server producing out of the recorded stream of raw video images, a stream of high resolution frames in accordance with the stream of desired frames. The high resolution frames are characterized by non perceptible boundaries between neighboring images derived from respective neighboring raw video images.

In some embodiments, the method includes determining several preset fixed frames for capturing respective fixed regions of interest.

In some embodiments, the method includes selecting a frame from frames like a preset fixed frame determined in advance for capturing a fixed region of interest, a virtual moving camera following an object in the scene, a virtual moving camera performing a pre-defined motion, a frame determined by an algorithm for automatic detection and inclusion of a predefined event, and a frame associated with an event which occurred in a certain location in the scene previously.

In some embodiments, the method includes transmitting to the venue server, for appending to a desired frame, instructions regarding data items like a graphical item, a desired artistic transition (like fade, dissolve, etc) between frames, an audio item and statistical data regarding identified events occurring in the scene.

In some embodiments, several arrays of video cameras are capturing the scene from two or more locations in the venue, and respective streams of panoramic views are transmitted to several production suites.

In some embodiments, a moving video camera is used in conjunction with the array of video cameras to capture the event.

In some embodiments, the transmitting to the production suite and the transmitting to the venue server are done using an internet link, preferably using a cloud service. In some embodiments it is done using a cellular link.

In some embodiments, the scene is a sports scene.

In some embodiments, a client module is selecting the stream of desired frames. The client module includes a displaying interface and a desired frame selector and controller. Preferably, it also includes a processing and communication unit. Exemplary displaying interfaces is a screen showing a panoramic view of a portion of a captured dynamic scene, and having a chosen field of view represented as a rectangle superimposed on the displayed scene. Another example is a monocular or binocular unit directly viewing the scene which includes a pan and tilt unit, frame size selection means and devices to measure the pan and tilt angles and the frame size for defining and controlling a desired field of view and means for graphical representation of the desired field of view.

Another possible displaying interface is a set of virtual reality goggles, which includes a display of a portion of the stream of panoramic views, and means for fitting the portion to head movement in similarity to a view seen by a real spectator of the scene having a similar head movement. Preferably, each goggle is fed by a different panoramic view such that a three dimensional scene is sensed by an operator wearing the goggles.

In some embodiments, a cloud server receives a sequence of panoramic views from the venue server, and streams the sequence of panoramic views to the client module using the world wide web.

In some embodiments, the method further includes preliminary calibrating the video cameras of the array based on mechanical design and lens specifications, and accurately calibrating of the video cameras based on the scene to get calibration parameters.

In some embodiments, the method includes further steps conducted at the venue server. The steps include decomposing frames captured by the video cameras into pixel tiles, the tiles are rectangular arrays of pixels whose size is smaller than a single camera frame size, associating the pixel tiles with time codes, and recording the pixel tiles. Preferably, the method also includes retrieving recorded pixel tiles associated with a selected frame, transforming stitching lines from world coordinates to camera coordinates and specifying the lines in the selected frame or close thereof, and geometrically aligning pixels belonging to neighboring video cameras using the calibration parameters. The method also includes blending pixel pairs in stitching zones belonging to neighboring video cameras in accordance with a distance from a stitching line, correcting color intensities of pixels belonging to different video cameras, and adjusting hue, saturation, intensity and gamma value of the entire frame.

Additional steps conducted at the venue server prior to transmitting to the remote production suite include low quality blending and aligning of neighboring frames captured by the array of video cameras, generating of low resolution panoramic view from the blended and aligned frames, and compressing and encoding the panoramic views for transmitting to the remote production suite.

In some embodiments, the method includes steps conducted at the remote production suite, like generating and distributing to operators partial frames of the panoramic view in accordance with respective region of interest, the operators moving across and zooming in and out the partial frames to get actual frames, presenting to a director the actual frames, and the director selecting an actual frame to go on air.

In some embodiments, the method includes encoding the stream of high resolution frames into a required output video format, and broadcasting or webcasting the formatted stream of high resolution frames.

It is provided according to preferred embodiment of the present application, a method for a production suite located remotely from a venue proximate to a scene. The production suite is operating in a coordinated way with a venue server in the venue for producing a stream of desired image frames derived from a panoramic capturing of the scene by an array of video cameras. The production suite method includes receiving from the venue server a stream of low-resolution panoramic views derived from a stream of raw video images captured simultaneously by the video cameras, selecting a stream of desired frames including respective regions of interest. The selected frames are portions of the low resolution panoramic views. The method also includes transmitting data on the stream of desired frames to the venue server.

In some embodiments, the method includes generating and distributing to operators in the production suite partial frames of the panoramic view in accordance with respective region of interest, the operators moving across and zooming in and out the partial frames to get actual frames, presenting to a director the actual frames, and the director selecting an actual frame to go on air.

It is provided according to preferred embodiment of the present application, a method for a venue server producing, by a coordinated operation with a production suite, a stream of desired image frames derived from a panoramic capturing of a scene by an array of video cameras. The method includes recording a stream of raw video images captured simultaneously by the video cameras, and converting the stream of raw video images to a stream of panoramic views at a reduced data rate, whereas the data rate reduction is by a factor of at least three. The method further includes transmitting the stream of panoramic views to the production suite for selecting thereof a stream of desired frames including respective regions of interest, whereas the selected frames being portions of the panoramic views, receiving from the production suite data on the stream of desired frames, and producing out of the recorded stream of raw video images, a stream of high resolution frames in accordance with the stream of desired frames. The high resolution frames are characterized by non perceptible boundaries between neighboring images derived from respective neighboring raw video images.

It is provided according to preferred embodiment of the present application, a method for a venue server producing a stream of desired image frames derived from a panoramic capturing of a scene by an array of video cameras. The method includes recording a stream of raw video images captured simultaneously by the video cameras, and receiving data on a stream of desired frames including respective regions of interest in the panoramic capturing of the scene. The method further includes producing out of the recorded stream of raw video images, a stream of high resolution frames in accordance with the stream of desired frames. Producing a frame includes actions restricted to only previously recorded images associated with the frame, like retrieving the only images associated with the frame from the recorded video images, and processing only the associated previously recorded images to get high resolution frame having non-perceptible boundaries between neighboring images.

In some embodiments, the data on a stream of desired frames is received from a client module comprising a displaying interface and a desired frame selector and controller. Preferably, the client module further comprises a processing and communication unit. Exemplary displaying interfaces include an high resolution screen showing a panoramic view of at least a portion of a captured dynamic scene having a chosen frame represented as a rectangle superimposed on the displayed scene, an head up display having head pose sensors, a partially reflecting transparent surface for direct real viewing of the scene and for reflecting a graphical representation of a chosen field of view displayed on a miniature screen, and a monocular or binocular unit. That ocular unit directly views the scene and includes pan and tilt unit, frame size control means, pan and tilt sensors and frame size measuring means for controlling and measuring the size and angles of a desired field of view and means for graphical representation of the desired field of view.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

Figure 1A:
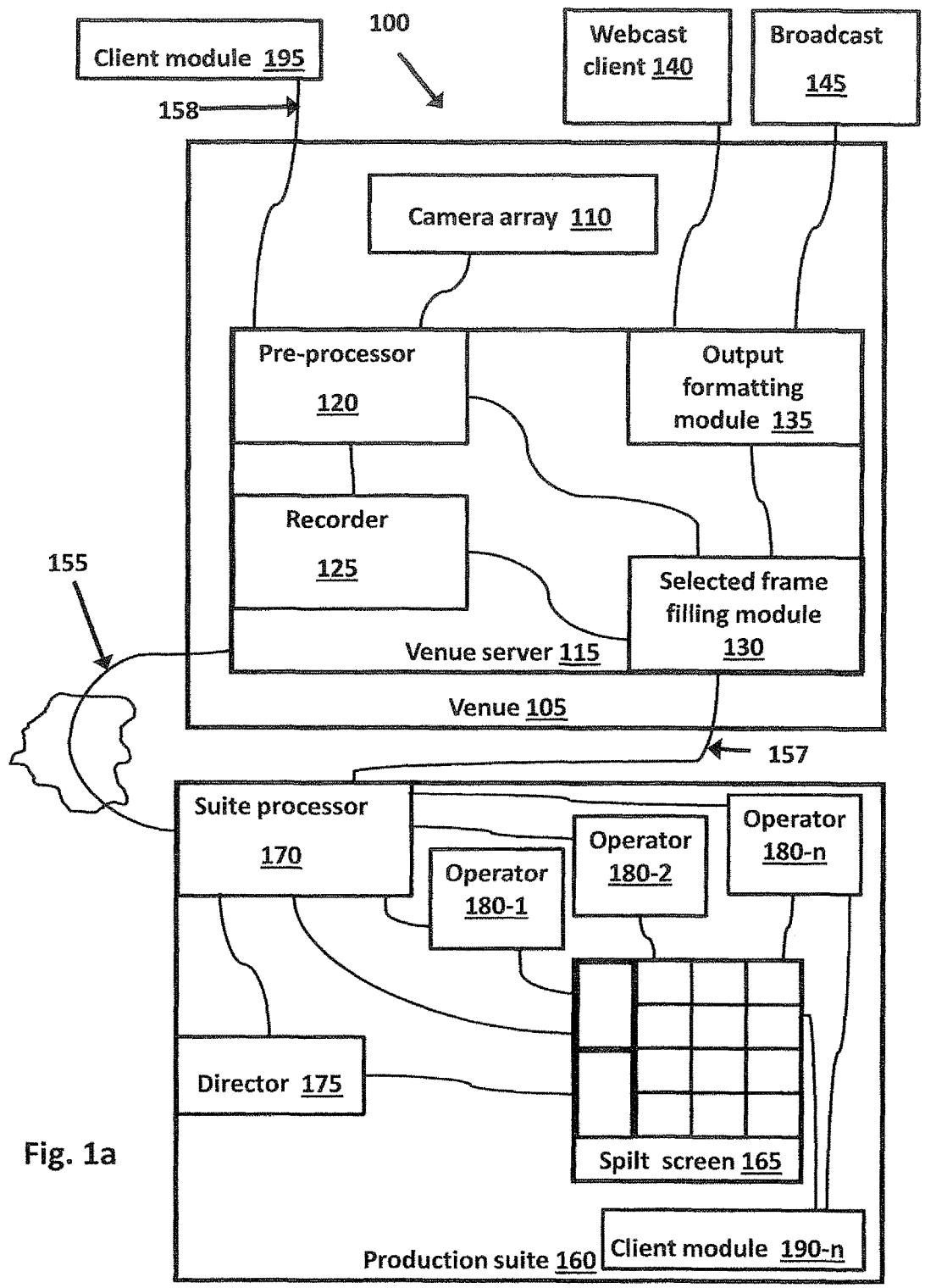
FIG. 1a illustrates a television production system divided between two locations connected by a low bandwidth communication link.

The present invention will now be described in terms of specific example embodiments. It is to be understood that the invention is not limited to the example embodiments disclosed. It should also be understood that not every feature of the methods and systems is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Definitions

The terms field of view, abbreviated as FOV, desired frame, and requested frame are used throughout this disclosure for describing a desired region in the scene or its image which a person would like to see, broadcast, etc.

A client module is a device, system or piece of apparatus used by an operator or a home user to view a panoramic scene or its image and communicate a desired field of view and specific data. In some embodiments the operator of a client module receives the desired field of view for personal viewing. In other embodiments he just specifies a field of view to be broadcast or webcast to others.

a virtual cameraman is in few embodiments a human operator located away from a scene whose task is to define a desired frame reflecting a region of interest. He/she is virtual in the sense that that he/she does not operate a real camera and only provides a service that helps a whole system to provide the service provided by a real cameraman located in the venue. In other embodiments a virtual cameraman might be a software agent or a specific program that provides he mentioned selection of a desired frame.

Referring now to FIG. 1a, it describes a system 100 for low cost television production, which includes a data server 115 in a venue 105 and a production suite 160. In the following, "in venue" production is described first, followed by a description of a coordinated production carried on by the venue server 105 and by the remote production suite 160. Then, interactive and immersive virtual reality embodiments for home users is presented. Finally, methods for these embodiments are presented.

Figure 1B:
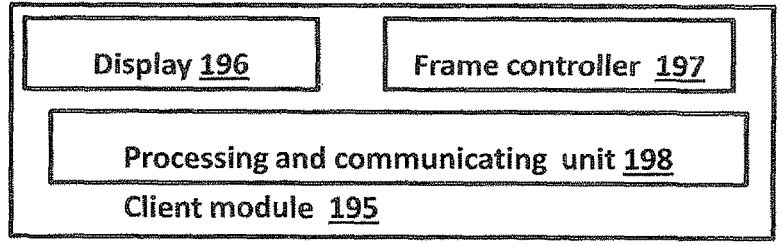
FIG. 1b is a block diagram of a client module

In Venue Live Production Embodiment (FIGS. 1a, 1b)

As mentioned, it is suggested a method and system for low cost efficient television production. The proposed method is supposed to replace current outdoor productions of general outdoors and especially sports scenes that are expensive in equipment and manpower. The system proposed herein is composed of a fixed camera array 110, a venue data server 115 and a client module 195. It is noted that the client module 195 is optional. The proposed system may be used only for post production applications, and for such applications neither a client module nor a production suite is required during the live capturing of the scene.

The cameras of array 110 are used for video acquisition. If there is more than one camera, the cameras are frame synchronized. Each camera is capturing video images of a certain zone of the scene. A lens is adjusted for each camera to cover the zone. The camera array 110 preferably covers a continuous zone of the venue. Optionally, a method of optimal coverage of the venue composed of lenses with a variety of focal lengths and cameras with different number and size of horizontal and vertical pixels may be used by packing simulation techniques. Typically, neighboring cameras have overlapping coverage zones.

The cameras of array 110 may be CMOS or CCD cameras. Each camera may be composed of a single or of three imagers. Preferably, the cameras are of industrial grade. The data output format of the cameras can be GigE, USB 3.0, Camera Link, HD-SDI or any other format available for such cameras.

The data from all cameras is transferred to the venue server 115, located besides the camera array, in another location in the venue or in a remote location like a broadcast studio or in a "cloud server farm". Data transmission from the camera array module to the data server may be done via optical cable or any other wired or wireless communication system. In a preferred embodiment of the current invention, the cameras have GigE output and a network switch with fiber optical cable used to transfer the data to the data server 115. The cameras data can also be transferred using the worldwide web.

The data server 115 includes the following modules:

A data acquisition and grabbing module, or pre-processor 120, to grab and initially process the camera data. This initial processing may be composed of cameras photometric and geometrical calibration, video compression process using methods such as JPEG2000 and MPEG2, image transformation and image enhancement processes such as high pass filtering and color correction, and generation of law resolution panoramic views. The photometric calibration process is preferably frequently repeated during the event. Typically, it is repeated every few seconds but in principle it can be done every frame or not done at all during an entire event. Such initial processing may also be done in the camera array 110 or in the client modules 195 or in the selected frame filling module 130.

A stitching and aligning module, or selected frame filling module 130, whose function is to adjust the color and brightness of the cameras involved in the desired frame, to transform the stitching lines from world to camera coordinates, to blend the pixels in the stitching zones and to geometrically align the outputs of the cameras composing the frame using one of the methods known in prior art to calibrate and align images captured by camera array. In another embodiment of the current invention, the stitching and alignment module may be located in a client module 195.

A data storage module, or recorder 125, whose function is to store at least a portion of the data acquired by the data acquisition module 120. The data storage module 125 is composed of either hard disks, flash memory modules or any other means for massive fast data storage. Module 125 stores the data for the live production, for replays, for post production as well as for other applications. In a preferred embodiment of the current invention, the video data recorded onto the recorder module 125 is raw or just slightly compressed video data wherein no pixels blending, alignment or other pixels processing tasks have been applied. In this preferred embodiment, all pixels blending, alignment and other processing tasks are done in the selected frame filling module 130 and only on pixels belonging to the single desired frame going on air and thus a lot of processing time and resources are saved.

The selected frame filling module 130, or a field of view(FOV) filling module also receives a requested frame FOV specification from a client. The client may be a human "virtual cameraman", or a computer program doing automatic event production. The FOV filling module 130 retrieves the required data from the data storage module and performs certain pixels operations on the acquired data. The operations of the FOV filling module 130 include geometrical image alignment, aberrations correction, vignetting correction, alignment, stitching zones blending, "minimum difference" stitching line drawing and a variety of image filter operations. The FOV filling module 130 transmits the matrix of pixels filling the frame as requested by the client. This process is done for each frame request.

The client module 195 can be located at the venue 105, remotely in a broadcast studio, remotely at a server farm, or remotely at a user home. The client module 195 is typically composed of a display means 196, a FOV controller 197 and optionally a processing and communicating unit 198, as shown by FIG. 1*b*.

The most common embodiment of the client display 196 is a high resolution LCD screen showing a panoramic view of at least a portion of the captured dynamic scene. The current FOV or desired frame as chosen by the client serving as a "virtual cameraman" is represented, for example, as a graphical rectangle superimposed on the captured scene.

Alternative client display 196 is a Head Up Display (HUD) module equipped is with head pose measuring sensors wherein the graphical representation of the current FOV is generated by means of a miniature LCD screen and a collimating optics and is reflected from a partially reflecting transparent surface mounted in front of the HUD. The user directly views the scenery through the transparent optical element. The desired FOV graphical representation is projected to infinity and is superimposed on the natural view of the virtual cameraman wearing the HUD. With such an HUD display module the virtual cameraman watches the real scenery and not a captured video.

Another optional client display 196 is a mono or binoculars unit mounted on top of a manually driven pan and tilt unit and frame sizecontrol means 197, and preferably having also means for pan and tilt angles and frame size measurement. The graphical FOV representation is injected to at least one eyepiece of this telescope (ocular) and is reflected from a partially reflecting beam splitter located in front, behind or within the eyepiece. The FOV graphical representation is superimposed with the operator's magnified natural view. The graphical FOV representation is generated by means of a miniature LCD screen and a collimating optics module. The advantage of this embodiment with respect to the former embodiment is the fact the virtual cameraman watches a magnified view of the natural scenery. The telescope's magnification is preferably adjustable.

Alternatively, standard camera handles are used as a frame controller 197 so that the cameraman is using its native operational environment, for defining and presenting the desired FONT or frame.

A set of virtual reality goggles may be used as client module 195, which includes a display of a portion of a view seen by the stream of panoramic views, and means for fitting the portion to head movement in similarity to a view seen by a real spectator of the scene having a similar head movement. Preferably, each goggle is fed by a different panoramic view such that a three dimensional scene is sensed by an operator wearing the goggles.

Another option for a FOV controller 197 is a software that automatically determines the FOV location and size on the panoramic venue view using image understanding and objects tracking techniques. For example, if the captured event is a football match, the proposed software automatically detects and tracks the players and the ball, automatically recognizes game events like free kick, corner kick etc and determines the appropriate size and location of the instantaneous FOV based on the nature of the current captured play event.

The FOV controller 197 may also be partially automatic and partially manual. In this case, either the automatic software or the human operator may have the override decision authority.

Figure 2:
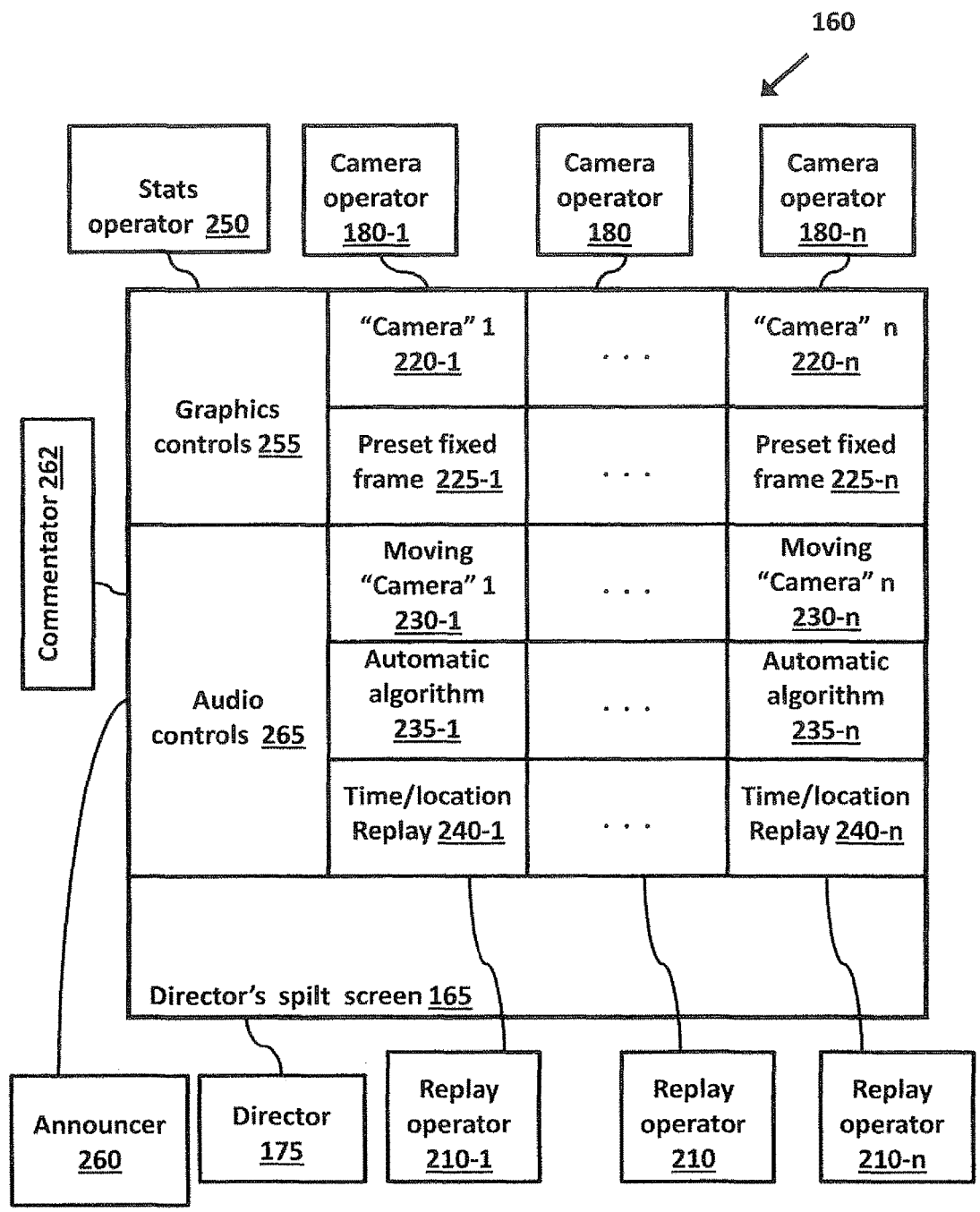
FIG. 2 is a block diagram of a production suite including director screen and an operators team.

Remote Live Production Embodiment (FIGS. 1*a*, 1*b* and 2)

Referring now to FIGS. 1*a* and 2, they illustrate a coordinated production by the venue server 115 and the production suite 160. The production suite 160, including team and equipment, is located in a remote production suite and not in the venue. The suite equipment includes a suite processor 170, a director split screen 165 and several client modules 190-*n* used by respective operators(virtual cameramen) 180-1,180-2, 180-*n*. The camera array 110 and the data server 115 are still located in the venue.

A stream of low resolution panoramic images or views is prepared as detailed below and transmitted to the remote production suite 160. The transmission can be done via the world wide web but can also be using any other wired or wireless transmission link 155. Also, a cloud service may be used for transmission. A low resolution representation is used to ensure real time high fidelity transfer of the data over low bandwidth communication links. Thus, in case a broad bandwidth data link is available, a full resolution or just higher resolution data may be transmitted.

A FOV specification process is done manually by a "virtual cameraman" or operators 1804, 180-2, 180 and 180-*n*. As an example, the operator 180-1 may use a joystick to move the FOV rectangle across the displayed dynamic scene and a button to setup the FOV size (magnification). More specifically, the suite processor 170 gets the panoramic views and distribute the whole panoramic view or portions thereof to displays used by operators 180-1, 180-2 ad 180-*n*. The director can define in advance preset fixed frames 225-1, . . . 225-*n* capturing fixed regions of interest, for example the bench in a basketball game or the referee stand in tennis. Such a preset frame may be selected by the director as the frame to go on air. An operator 180-1 can use this or another preset frame as a starting frame, he can then use a joystick to move across the panoramic view (or the portion of the panoramic view allocated to him) and another control to zoom in and out. The operator can also use a starting frame that is a portion of the panoramic view (or of the portion of the panoramic view allocated to him) which he is manually selecting. The operator 180-1 generates a frame 220-1 displayed for the director choice. As an example, operator 180-1 represents a leading camera "virtual cameraman" and operator 180-2 generating frame 220-2 is a closeups "virtual cameraman".

Other options for a desired frame to go on air which are displayed for the director's choice are a moving virtual camera 230-1 performing a pre-defined virtual motion or tracking an object in the scene, a frame 235-1 determined by an algorithm for automatic detection of a predefined event, and a frame 240-1 selected by replay operator 210-1 associated with an event which occurred in a certain location in the scene previously for a time/location replay. Similarly, camera operator 180-n generates a frame 220-n using the frame controller 197, replay operator 210-n generates a replay frame 240-n while preset fixed frame 225-n, moving camera 230-n, and automatic algorithm 235-n are predefined by the director 175.

Replay operators 210-1, 210-2 and 210-n use the traditional switches and controls of a sports replay machine or a more specific frame controller 197 allowing location change to get a time/location replay 210-1 or 210-n.

Moving the desired frame in pan and tilt directions and changing the zoom may be conducted using client modules like a mouse or a system based on hand gestures recognition. Operator 180-n, for example, uses a set of virtual reality goggles as client module 190-n. Set 190-n includes a display of a portion of a view seen by the stream of panoramic views, means to adjust the visual magnification and means for fitting the portion to head movement in similarity to a view seen by a real spectator of the scene having a similar head movement. Preferably, each goggle is fed by a different panoramic view such that a three dimensional scene is sensed by an operator wearing the goggles.

An event director 175 accepts several frames coming from several operators 180-1, 180-2, 180-n, 210-1, 210, 210-n. These views are displayed for him on a split screen 165 or on plurality of video monitors. Other views constantly displayed on the director's split screen are the predefined preset frames 225-1 and 225-n, the frames 2354 and 235-n generated by automatic algorithms and icons 230-1 and 230-n representing the predefined moving virtual cameras. The director selects the view he/she wants to go on air at a given time. This process is done continuously throughout the entire production, where usually at a given time only one frame is going on air. The transition between desired frames selections occurs in arbitrary points of time and once an operator output is selected it stays on air until further selection.

Sometimes, transition occurs gradually such that two selections of desired frames are presented simultaneously with the old one fading out while the new one takes over. Other transition effects like wipe are also possible. The director can select the transition he would like to have when the switch to another frame is launched.

The director 175 also selects the audio channel he would like to go on air and the audio signal specifications. For example he can choose the commentator 262 or announcer 260 feeds as well as the ambient venue noise as well as the sound volume using his audio controls 265. He can also mix several sound sources together. In addition, the director can select graphical objects to be superimposed on the frame going on air using the graphics controls 255 on his screen. The templates displayed on the screen can also represent animations. In addition a stats operator 250 loads statistical data into the suite processor 170 using the graphics controls 255. The director selects the timing and shape for this data to be presented to the viewers. The director 175 decides which of these audio, graphics, transition and stats data items should accompany the selected stream of frames, and data and instructions regarding these data items are submitted to the venue server 115 with the data on the selected frames.

The participation of the event director 175 is just optional. In case there is a single virtual cameraman 180-1 or an automatic software 235-1 determining the FOV, there is just a single feed and no need for an event director.

The specification of the current FOV to go on air, represented for example by four angular coordinates, is sent back to the venue server 115 by means of the world wide web or any other wired or wireless transmission link 155 or 157. In the venue 105, the selected frame filling module 130 renders the specified FOV with the high resolution cameras data that have been previously recorded onto the recorder 125. In addition, the audio, stats and graphical data items are embedded within the produced stream of high resolution frames.

An output formatting module 135 prepares the stream of frames to the required video standard and transmits it to the TV station studio 145 or directly to the TV viewers using satellite, cable or any other broadcast transmission method. Additional destination with increasing popularity nowadays is a webcast media 140 allowing users to view the streamed presentation over the internet. The signal can also be directed to an individual web client, a home user, directly or via a cloud server, according to his specified frames sequence request. The generated high resolution sequence of frames may also be transmitted back to the production suite using link 157.

Sometimes, a venue cameraman with a shoulder mounted or another moving real camera is capturing the scene in addition to the fixed camera array 110. The stream of frames produced by the moving camera is transmitted to the production suite 160, possibly after some reduction of its data rate and compression, while raw images are recorded on recorder 125 alongside with the fixed cameras footage. The moving real camera transmitted video stream is displayed to the director together with the other "virtual" frames. In case the director 175 is selecting this stream of images to go on air, an appropriate instruction is transmitted to the venue server 115, and the stream of previously recorded high resolution images are broadcasted, possibly after some processing.

In some embodiments, several arrays 110 of video cameras are capturing the scene from several venue locations. In these embodiments or in other embodiments the streams of panoramic views are transmitted to one or more production suites 160.

Virtual Reality Embodiment for Home Users (FIGS. 1a, 1b and 2)

In this embodiment of the current invention the client is a home user using a virtual reality headset 195 with wide FOV and built in sensors to measure the instantaneous head position. One example of such a headset is manufactured by Oculus VR of Irvine, Calif., having a FOV of 110 degrees.

The virtual reality headset, originally designed for garners, is absolutely opaque to the outside world and offers the users a totally immersive experience. This experience can also be stereoscopic when different left and right eye views are projected correspondingly in front of the left and right eyes of the headset user. Typically such commercial headsets have also built in speakers to enhance the visual experience with an immersive audio environment.

In this embodiment, a sequence of panoramic frames is continuously sent from the venue server 115 to the client processor 198 using the world wide web preferably via a cloud service or using any other transmission link. The user can dynamically determine the zoom level he wants using a zoom control. When turning his head the head position sensors read the new pose. The head position parameters are transmitted to the processor 198 and the new FOV is thus generated and immediately presented to the user.

It is also possible to generate a stereoscopic representation of the captured event. One preferred way to do that is to use the Stergen's system as described in US patent Publication 2012/0013711 to Tamir et al, to convert in real time the 2D representation to 3D stereoscopic one. There are other ways to generate a stereoscopic visual representation including using at least two camera arrays with the appropriate lateral separation and convergence, using a single array with at least partially overlapping zones or using a generic 2D to 3D convertor like IF-2D3D1 manufactured by JVC.

Alongside the pixels data, audio data from a microphone located in the venue, preferably two microphones, maybe transmitted to the processor 198 alongside the visual data and synchronized with the video stream. The audio/visual data is transmitted to the projection devices built into the headset 195 worn by the home user and into the built in speakers. In case there are no such built in speakers, the data can be routed into an external speaker located nearby the home user.

In case there is a 3D stereoscopic representation of the event, two streams of data are separately directed into the left and right eyes projection means in the headset 195. The data streams going to the left and right eyes, as well as the audio data, are slaved to the headset's built in sensors measuring the head position. When a head position parameter (pan, tilt and roll angles, three translation axes) changes, the new head position parameters are sent to the processor 198. A corresponding new FOV is then calculated using the new parameters of the headset position.

Figure 3:
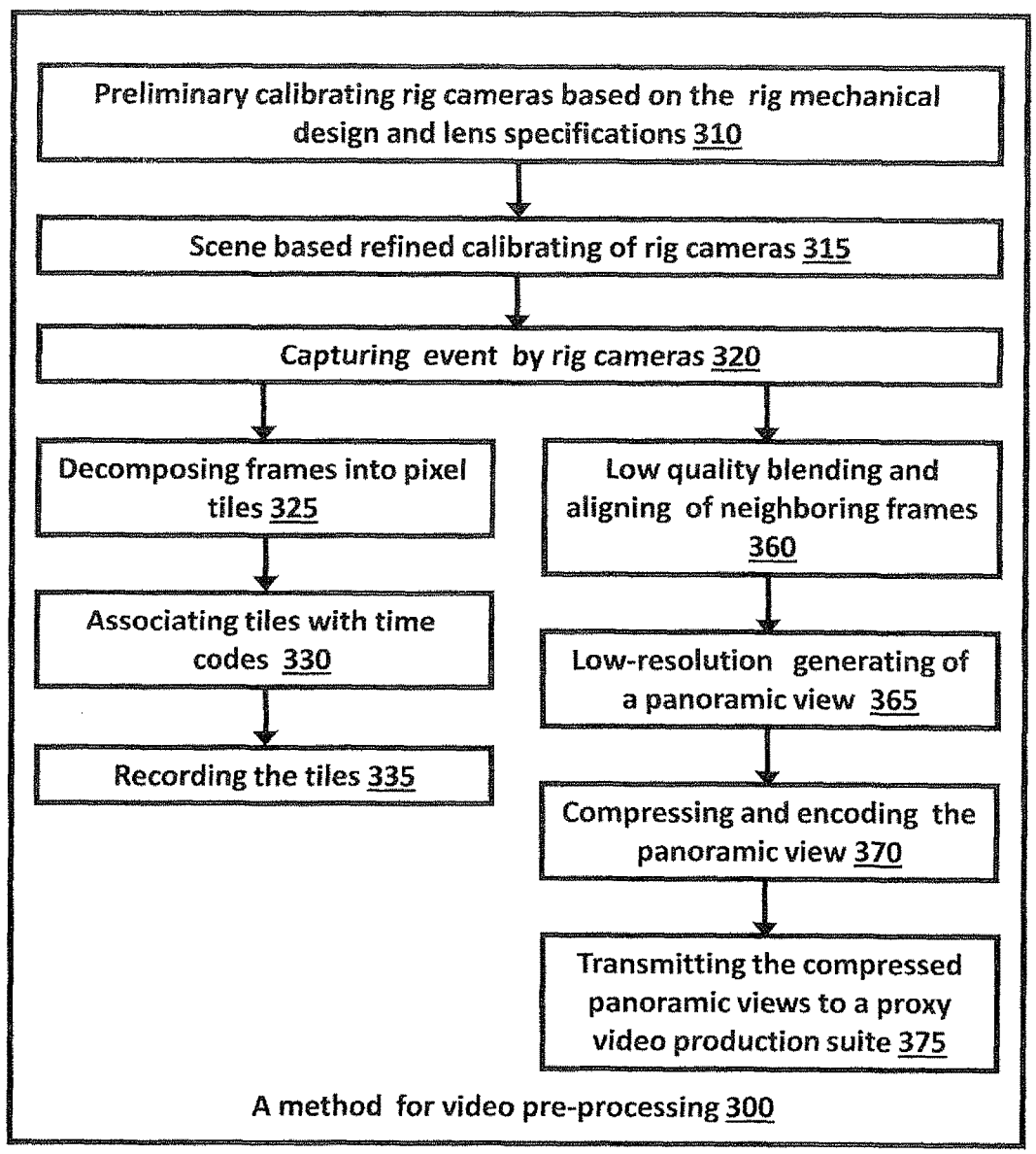
FIG. 3 is a flow chart of a method for video pre-processing by a venue server.
Figure 4:
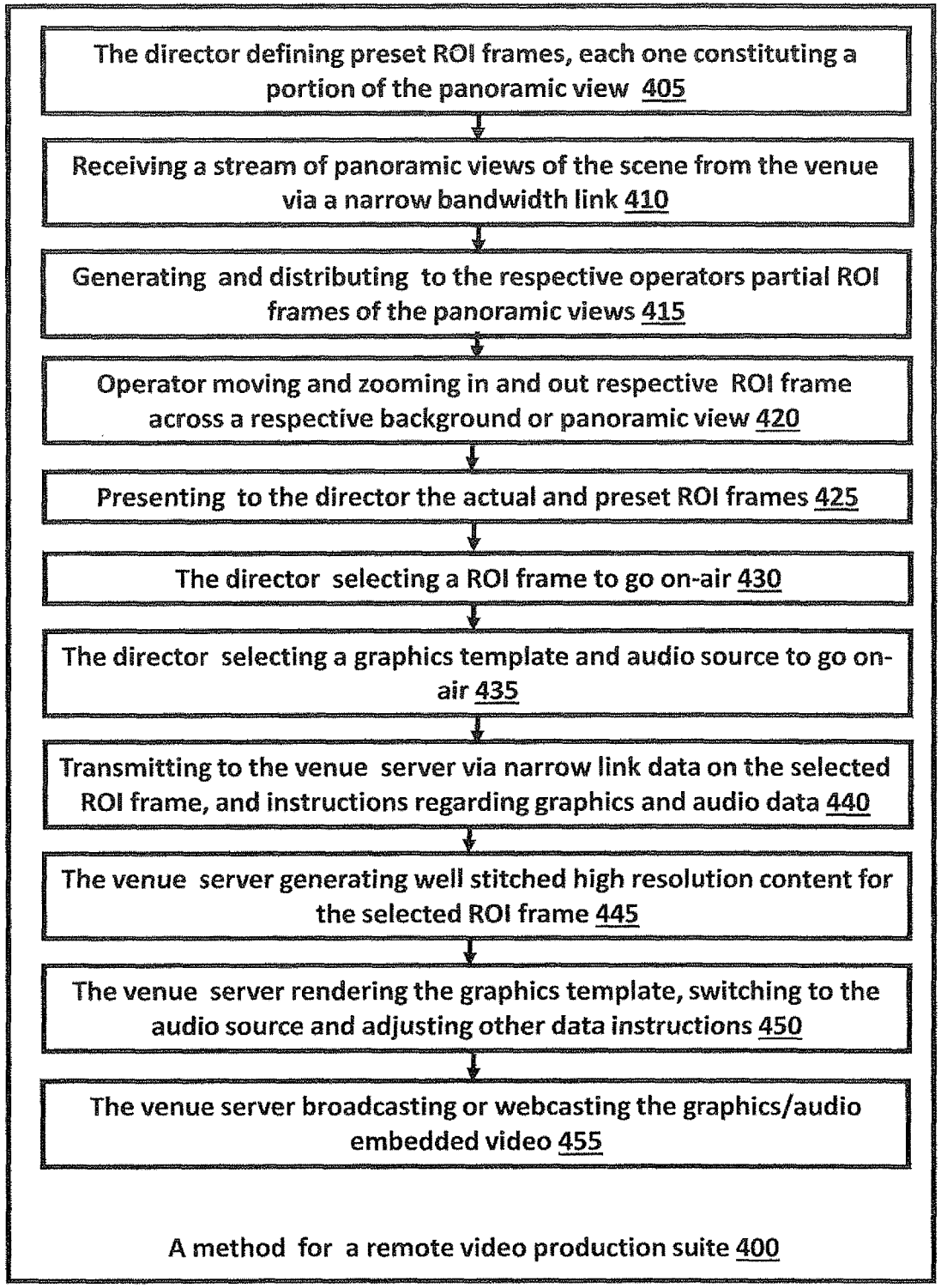
FIG. 4 is a flow chart of a method for a remote production suite.
Figure 5:
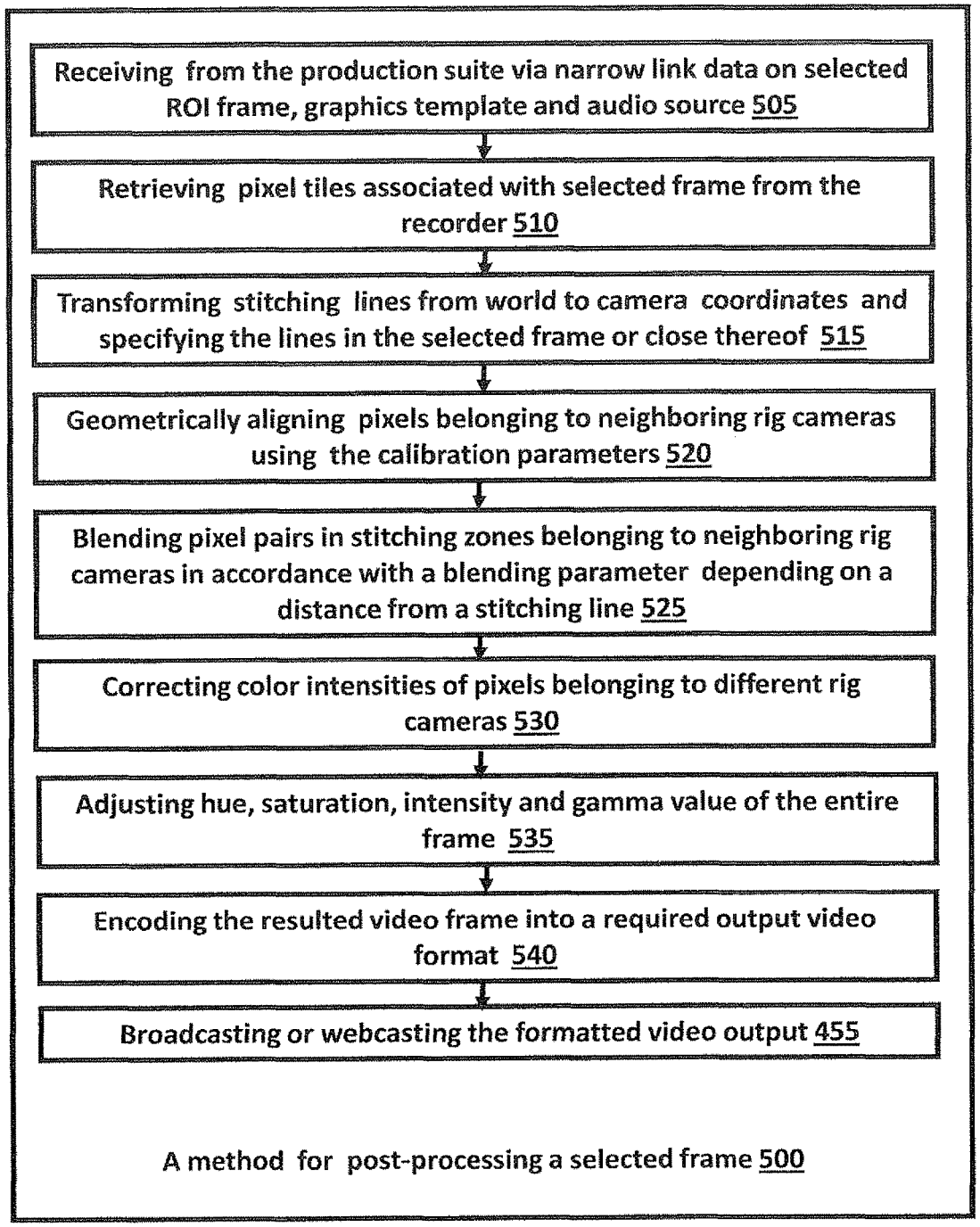
FIG. 5 is a flow chart of a method for post processing a selected frame by the venue server.

Methods for Producing a Stream of Desired Image Frames (FIGS. 3-5)

It is provided a method for producing a stream of desired image frames derived from a panoramic capturing of a scene by an array of video cameras 110. The method is presented in FIGS. 3-5 which includes a flow chart of a method 300 for pre-processing in a venue server 115, a coordinated method 400 carried by the venue server 115 proximate to the scene and at a production suite 160 located remotely from the venue 105, and a method 500 for post processing by the venue server 115.

Method 300, carried by the venue server 115, includes a step 310 of preliminary calibrating of the video cameras of the array 110 based on mechanical design and lens specifications, a step 315 of accurately calibrating of the video cameras based on the scene to get calibration parameters, and a step 320 of capturing an event by the rig cameras of array 110 to get a stream of raw video images.

Method 300 includes two steps of pre-processing the raw images which are conducted continuously in parallel. The first step is recording a stream of raw or just slightly compressed video images captured simultaneously by the video cameras. The second step is converting the stream of video images at a first data rate to a stream of panoramic views at a second data rate. The second data rate is less than one third of the first data rate.

Within the framework of recording, method 300 includes a step 325 of decomposing frames captured by the video cameras into pixel tiles, a step 330 of associating the pixel tiles with time codes, and a step 335 of recording the pixel tiles in recorder 125.

Within the framework of converting the raw images, method 300 includes a step 360 of low quality blending and aligning of neighboring frames (generated by neighboring cameras) captured by the array 110 of video cameras, a step 365 of generating low resolution panoramic view from the blended and aligned frames, and a step 370 of compressing and encoding the panoramic views for transmitting to the remote production suite 160. Step 370 is followed by step 375 of transmitting the stream of panoramic views to the remote production suite 160 through a low bandwidth link 155.

Coordinated method 400 includes a step 405 of determining several preset fixed frames and virtual camera preprogrammed motions for presenting respective fixed regions of interest constituting portions of the panoramic views and desired camera motions across the scene. A stream of panoramic views is continuously transmitted from the venue server 115 as represented in step 410. Method 400 further includes a step 415 of generating and distributing to operators partial frames of the panoramic views in accordance with respective regions of interest. For example, the leading "virtual cameraman" receives the panoramic view of the whole scene while "virtual cameraman" 2, supposed to produce a tighter image, receives the frame of the leading cameraman as a background view to move across. Method 400 also includes a step 420 of the operators moving across and zooming in and out the panoramic frames to get actual frames, and a step 425 of presenting to a director 175 the actual "virtual cameramen" and replay, preset, moving cameras and "automatic algorithm" frames.

Method 400 also includes a step 430 of the director 175 selecting an actual frame to go on air, and a step 435 of the director 175 selecting a graphics template, an audio source, transition and stats data to go on air.

In addition, method 400 includes a step 440 of transmitting data on the stream of desired frames to the venue server 115 together with instructions regarding the graphics, audio, transition and stats data using a narrow bandwidth link 155, a step 445 of generating well stitched high resolution content for the selected frames, a step 450 of rendering the graphics template, switching to the audio source and adjusting other data instructions, and a step 455 of broadcasting or webasting the graphics/audio embedded video stream. The high resolution frames are characterized by non perceptible or seamless boundaries between neighboring images derived from respective neighboring raw video images.

Referring now to FIG. 5, it presents a flow chart of a method 500 for post processing and rendering the desired sequence of frames in the venue server 115. The method 500 includes a step 505 of receiving from the production suite data on the stream of desired frames, graphics template, audio source and specifications and other data, a step 510 of retrieving recorded pixel tiles associated with a selected frame, a step 515 of transforming stitching lines from world coordinates to camera coordinates and specifying the lines in the selected frame or close thereof, and a step 520 of geometrically aligning pixels belonging to neighboring video cameras using the calibration parameters. The method 500 also includes blending pixel pairs in stitching zones belonging to neighboring video cameras in accordance with a distance from a stitching line, a step 530 of correcting color intensities of pixels belonging to different video cameras, and a step 535 of adjusting hue, saturation, intensity and gamma value of the entire frame.

Method 500 further includes a step 540 of encoding the stream of high resolution frames into a required output video format, and a step 455 of broadcasting or webcasting the formatted stream of high resolution frames.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A method for producing, by a coordinated operation conducted at a venue proximate to a scene and at a production suite located remotely from the venue, a stream of desired image frames derived from a panoramic capturing of the scene by an array of video cameras, the method comprising:
   (a) a venue server recording a stream of raw video frames associated with images captured simultaneously by the video cameras, decomposing said raw video frames into pixel tiles, associating said pixel tiles with time codes, and recording said pixel tiles;
   (b) converting said stream of raw video frames at a first data rate to a stream of panoramic views at a second data rate, said second data rate being less than one third of said first data rate;
   (c) transmitting said stream of panoramic views to at least one remote production suite;
   (d) in the remote production suite, selecting a stream of desired frames including respective regions of interest by a plurality of operators, the selected frames being portions of respective panoramic views;
   (e) transmitting data on said stream of desired frames to said venue server, retrieving recorded pixel tiles associated with said stream of desired frames, transforming stitching lines from world coordinates to camera coordinates, and specifying lines in the stream of desired frames or close thereof; and
   (f) said venue server geometrically aligning pixels belonging to neighboring video cameras using calibration parameters to produce out of the recorded pixel tiles, a stream of high resolution frames being characterized by non perceptible boundaries between raw video images recorded by neighboring video cameras.

2. The method of claim 1 wherein the method includes determining a plurality of preset fixed frames as desired frames for presenting a respective plurality of fixed regions of interest.

3. The method of claim 1 wherein the selecting a stream of desired frames includes selecting a frame from a group of frames consisting of:
   (i) a preset fixed frame determined in advance for capturing a fixed region of interest;
   (ii) a virtual moving camera following an object in the scene;
   (iii) a virtual moving camera performing a pre-defined motion;
   (iv) a frame determined by an algorithm for automatic detection and inclusion of a predefined event; and
   (v) a frame associated with an event which occurred in a certain location in the scene previously.

4. The method of claim 1, wherein the method includes transmitting to the venue server for appending to a desired frame instructions regarding at least one data item selected from of a group consisting of:
   (a) a graphical item;
   (b) a desired artistic transition between frames;
   (c) an audio item; and
   (d) statistical data regarding identified events occurring in the scene.

5. The method of claim 1, wherein two or more arrays of video cameras are capturing the scene from two or more venue locations, and respective streams of panoramic views are transmitted to one or more production suites.

6. The method of claim 1, wherein at least one moving video camera is used in conjunction with the array of video cameras to capture an event.

7. The method of claim 1, wherein at least one of said transmitting to said production suite and said transmitting to said venue server is done using an internet link.

8. The method of claim 1, wherein a client module is selecting said stream of desired frames, said client module comprising a displaying interface and a desired frame selector and controller.

9. The method of claim 8, wherein:
   (a) a cloud server receives a sequence of panoramic views from said venue server; and,
   (b) said cloud server streams said sequence of panoramic views to said client module using the world wide web.

10. The method of claim 1, wherein the method includes at least one step conducted at the venue server and selected from a group of steps consisting of:
    (i) low quality blending and aligning of frames captured by neighboring video cameras;
    (ii) generating of low resolution panoramic view from the blended and aligned frames; and,
    (iii) compressing and encoding the panoramic views for transmitting to the remote production suite.

11. The method of claim 1 wherein the method includes at least one step conducted at the remote production suite and selected from a group of steps consisting of:
    (i) generating and distributing to the operators partial frames of the panoramic view in accordance with respective region of interest;
    (ii) said operators moving across and zooming in and out said partial frames to get actual frames;
    (iii) presenting to a director said actual frames on a split screen; and
    (iv) said director selecting an actual frame to go on air.

12. The method of claim 1 wherein the method includes:
    (i) encoding said stream of high resolution frames into a required output video format; and,
    (ii) broadcasting or webcasting the formatted stream of high resolution frames.

* * * * *